Figure 1:
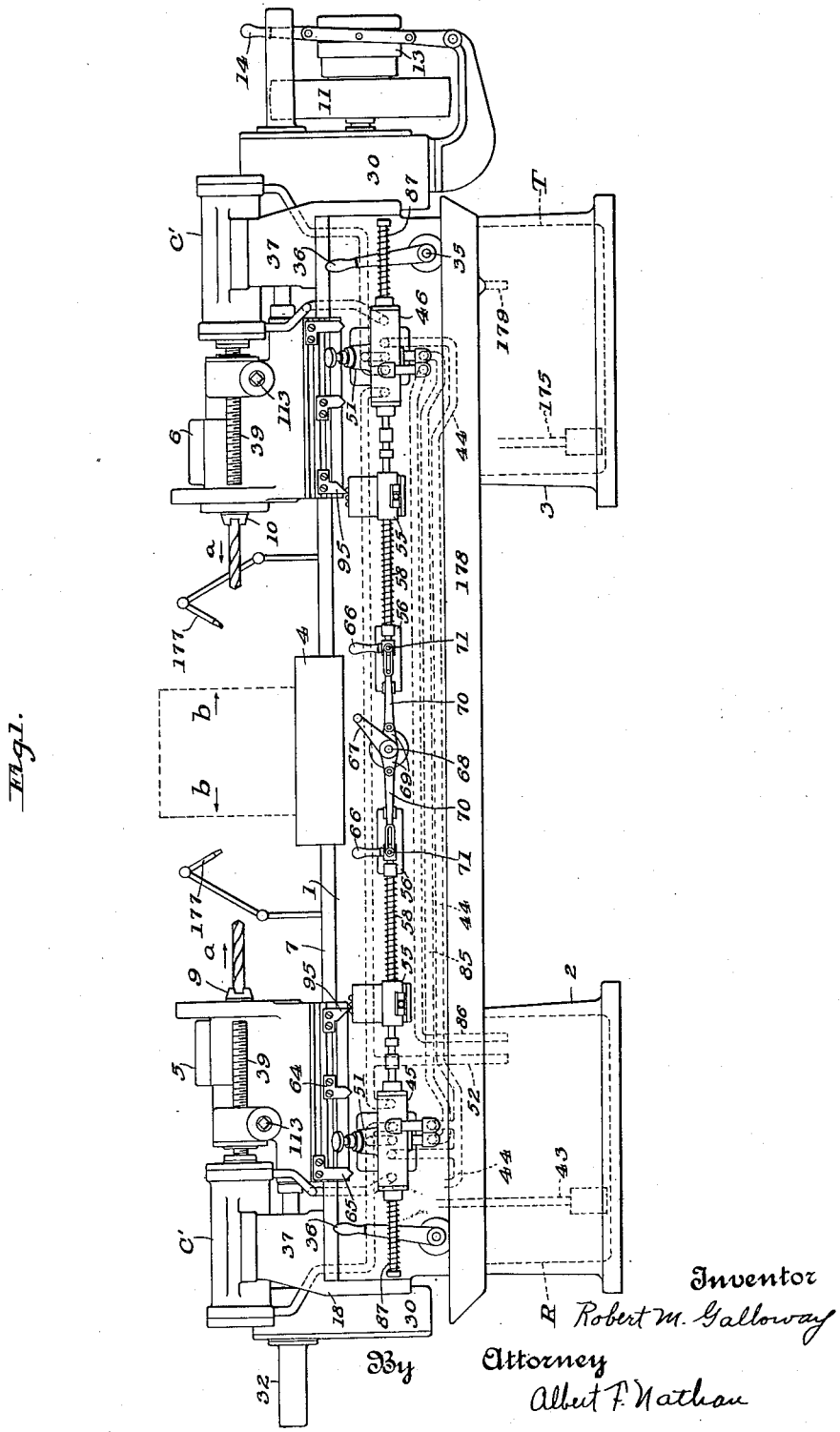

Jan 6, 1931.  R. M. GALLOWAY  1,787,781
HYDRAULICALLY OPERATED WAY DRILL
Filed July 30, 1926   11 Sheets-Sheet 1

Inventor
Robert M. Galloway
By Attorney
Albert F. Nathan

Jan 6, 1931.  R. M. GALLOWAY  1,787,781
HYDRAULICALLY OPERATED WAY DRILL
Filed July 30, 1926  11 Sheets-Sheet 2

Inventor
Robert M. Galloway
By Attorney
Albert F. Nathan

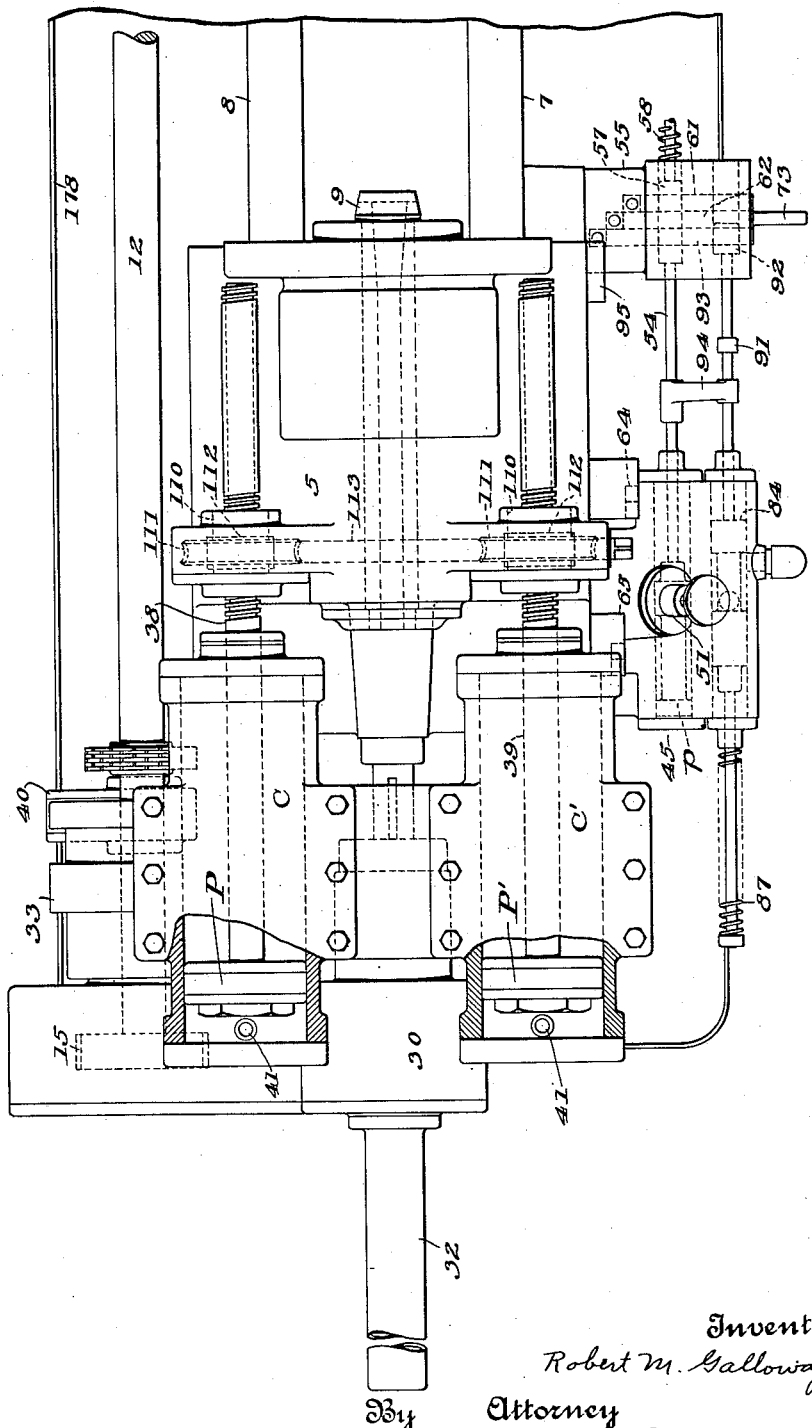

Jan 6, 1931.  R. M. GALLOWAY  1,787,781
HYDRAULICALLY OPERATED WAY DRILL
Filed July 30, 1926  11 Sheets-Sheet 5
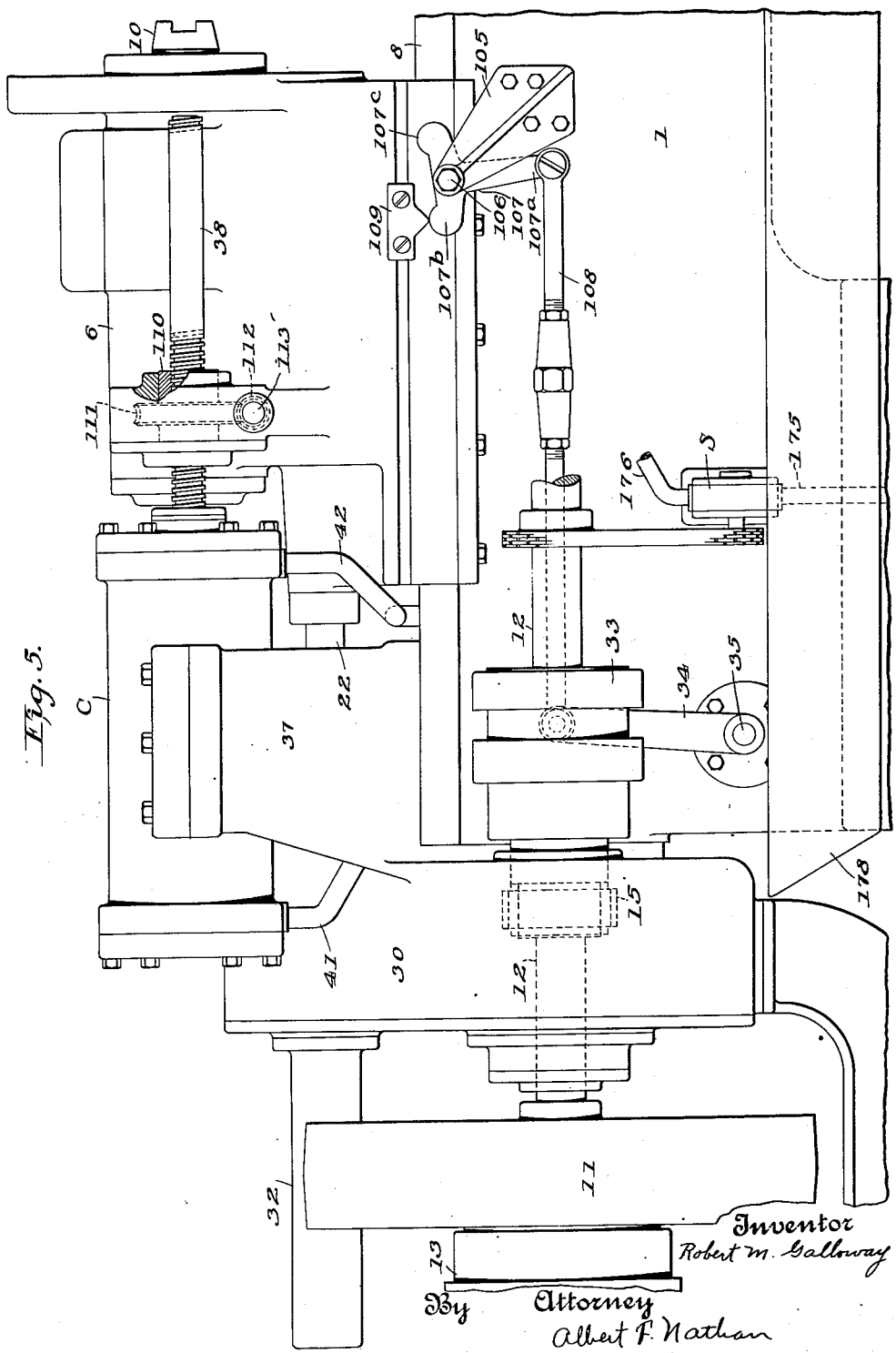
Inventor
Robert M. Galloway
By Attorney
Albert F. Nathan

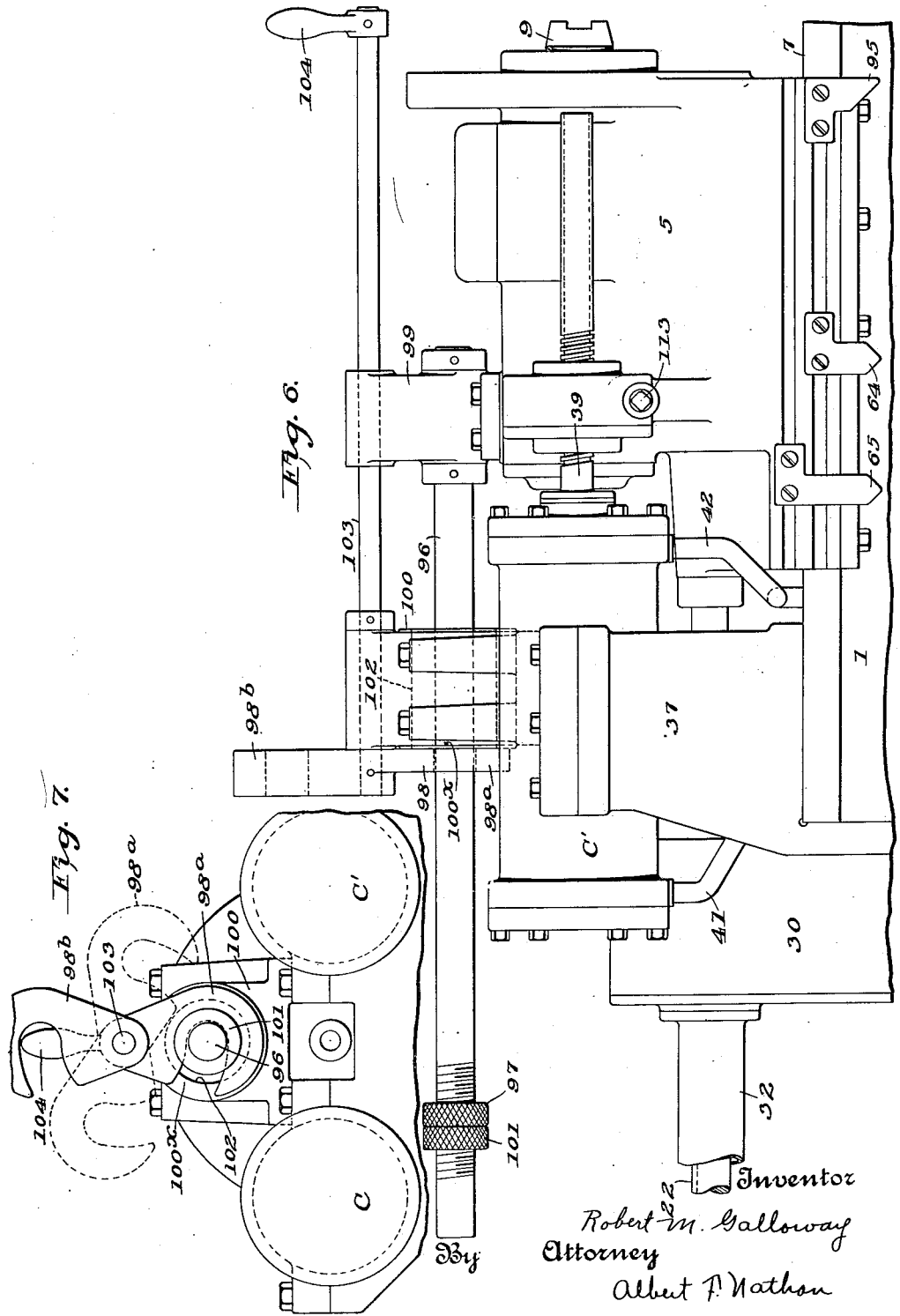

Jan 6, 1931. R. M. GALLOWAY 1,787,781
HYDRAULICALLY OPERATED WAY DRILL
Filed July 30, 1926 11 Sheets-Sheet 7
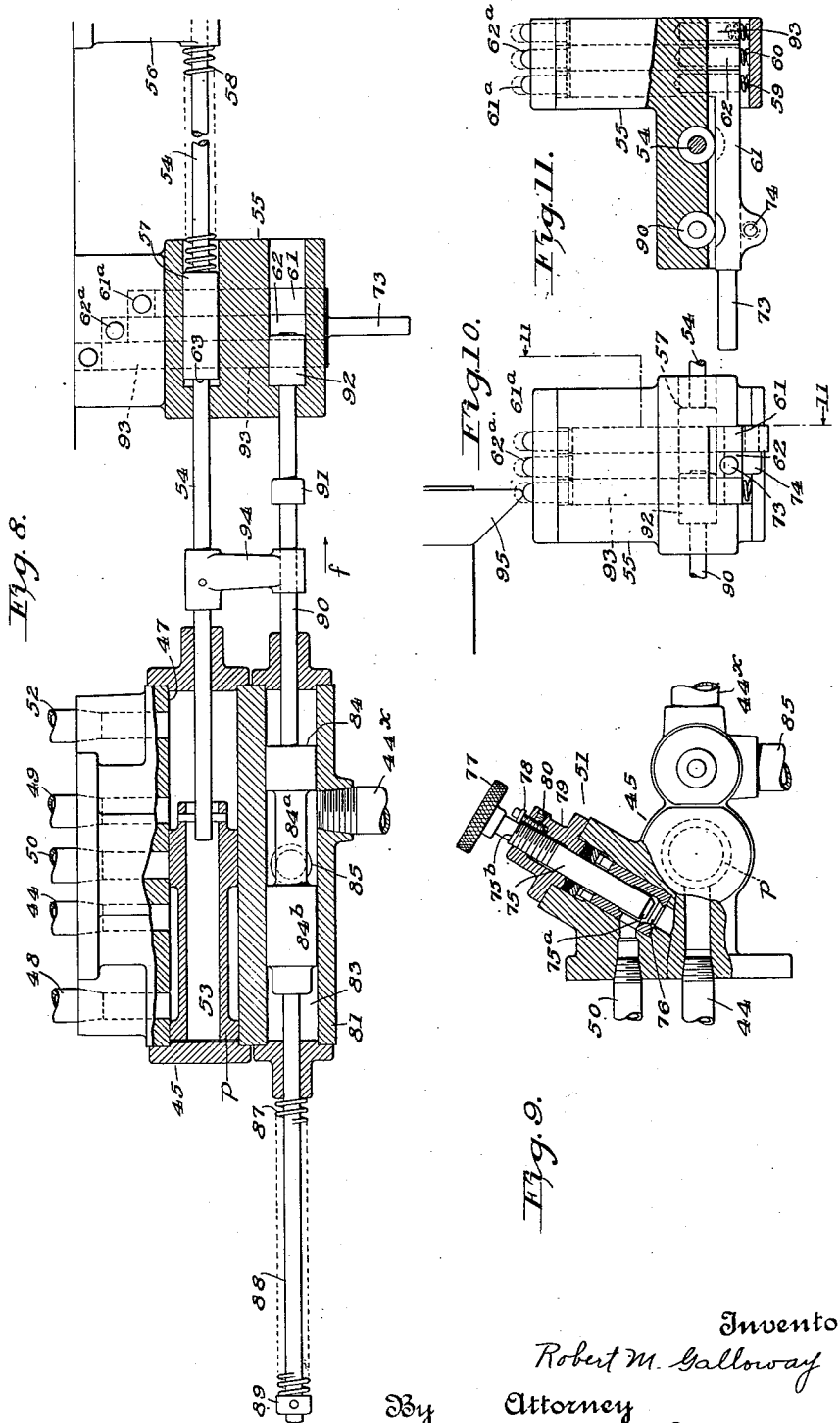
Inventor
Robert M. Galloway
By Attorney
Albert F. Nathan Jan 6, 1931.    R. M. GALLOWAY    1,787,781
HYDRAULICALLY OPERATED WAY DRILL
Filed July 30, 1926    11 Sheets-Sheet 9
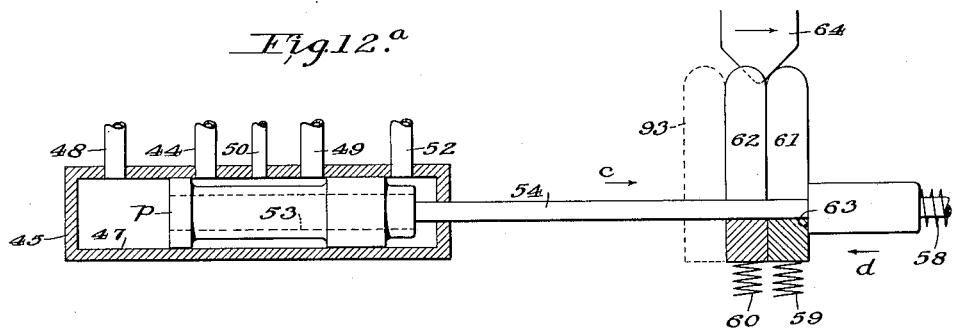
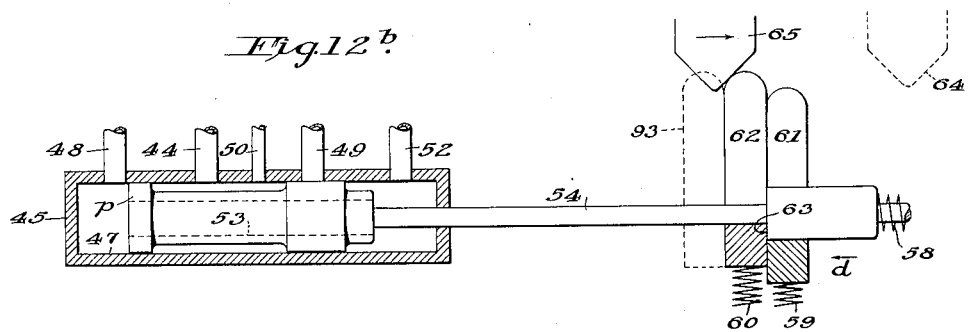
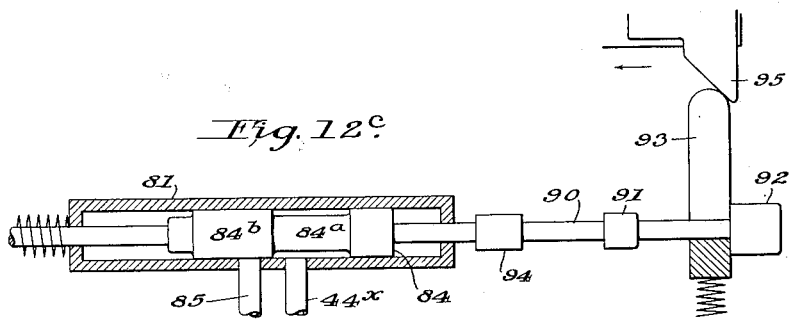
Inventor
Robert M. Galloway
By Attorney
Albert F. Nathan Jan 6, 1931.    R. M. GALLOWAY    1,787,781
HYDRAULICALLY OPERATED WAY DRILL
Filed July 30, 1926    11 Sheets-Sheet 10
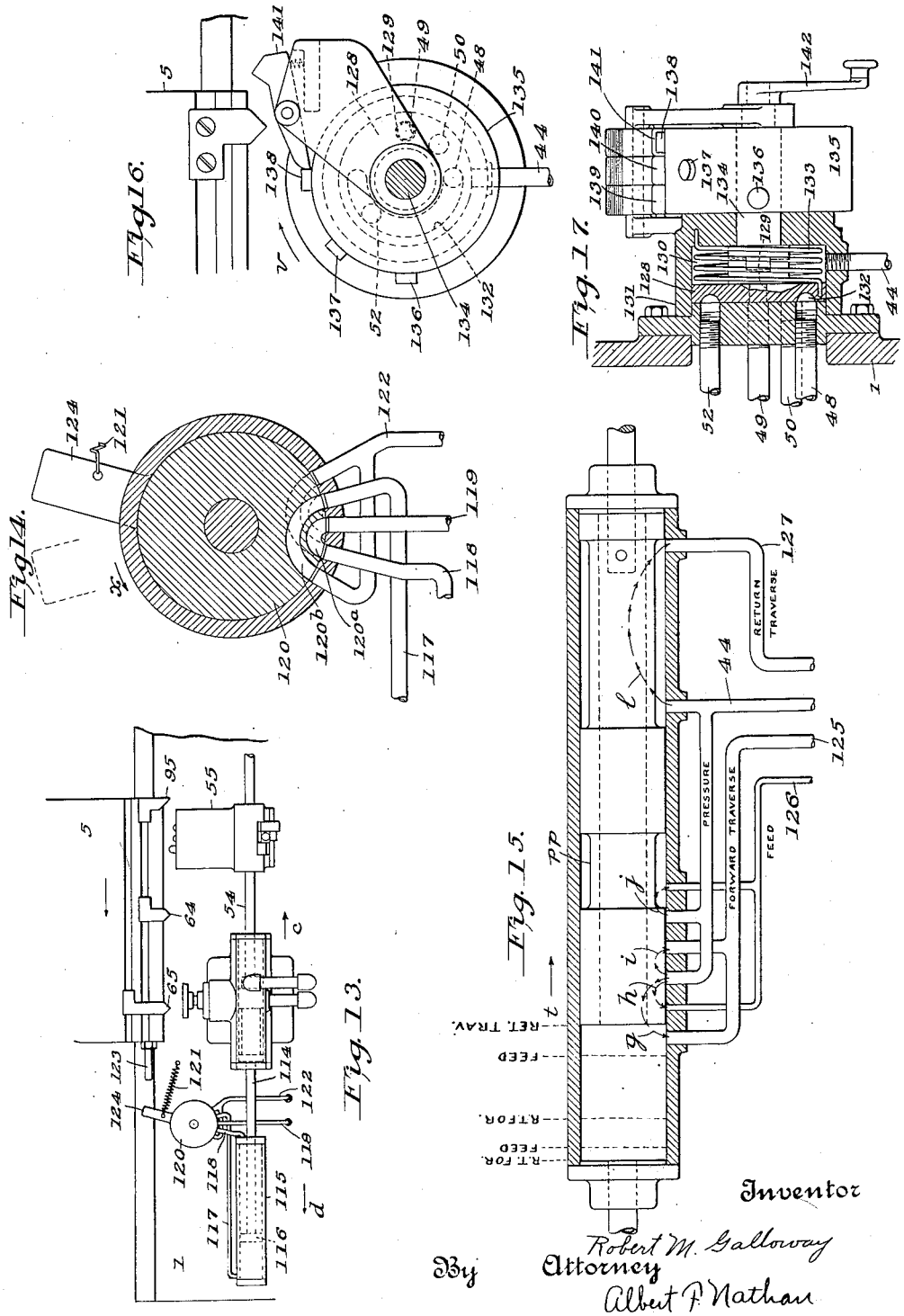
Inventor
Robert M. Galloway
By Attorney
Albert P. Nathan

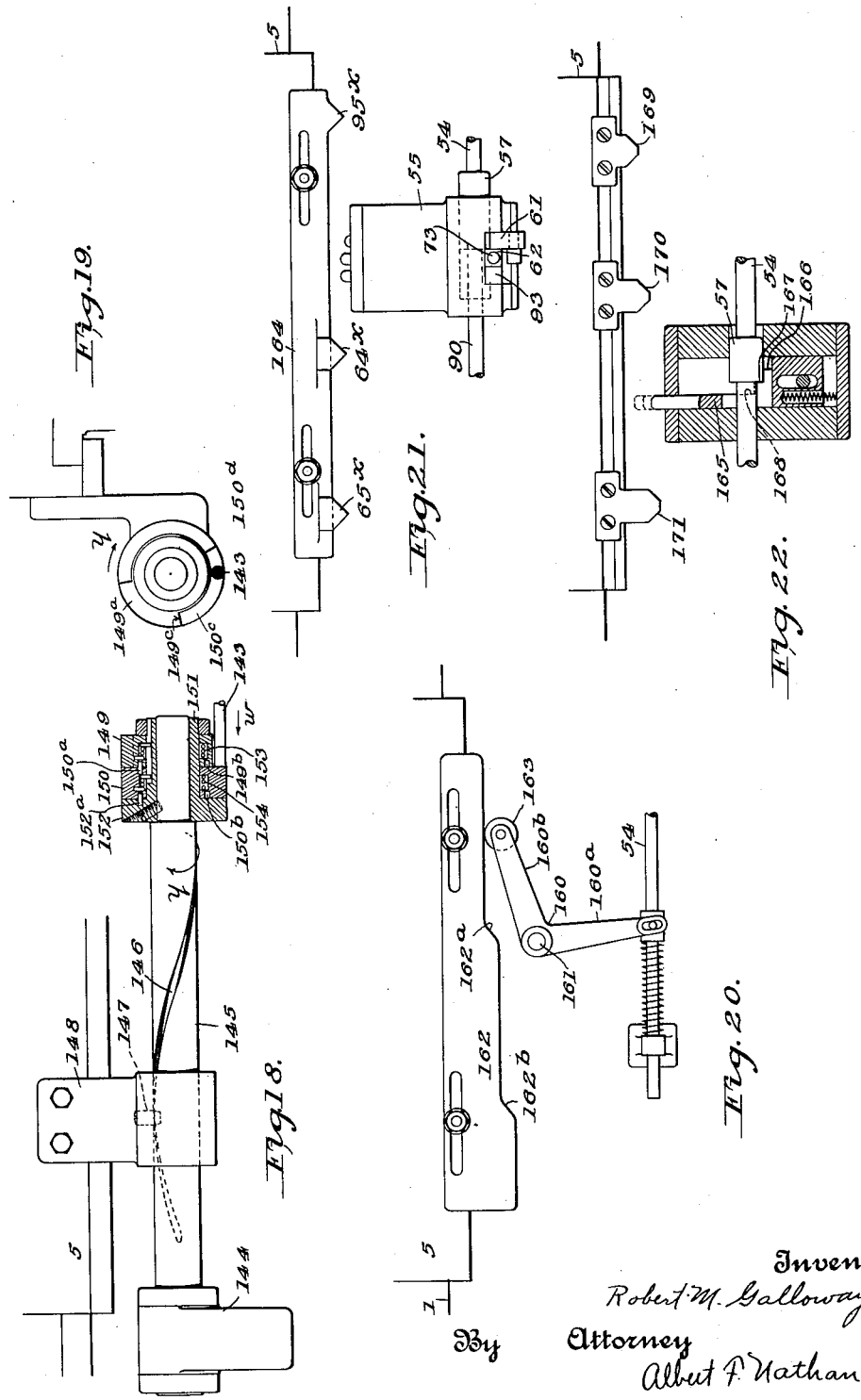

Patented Jan. 6, 1931

1,787,781

UNITED STATES PATENT OFFICE

ROBERT M. GALLOWAY, OF RICHMOND, INDIANA, ASSIGNOR TO THE NATIONAL AUTOMATIC TOOL COMPANY, OF RICHMOND, INDIANA, A CORPORATION OF INDIANA

HYDRAULICALLY-OPERATED WAY DRILL

Application filed July 30, 1926. Serial No. 125,869.

This invention relates to machine tools of that type in which the tooling operation is performed by relative bodily movement between a tool and a work piece, each of which is held in a suitable holder. Machine tools of this general description may be utilized to perform various operations such, for example, as slotting, shaping, planing, pressing, etc., and, where means is provided to effect relative rotation between the tool and the work, they may be used for drilling, reaming, spinning and like operations.

Heretofore the relative movement between the tool holder and the work holder has been effected by complicated mechanical power transmissions which are costly to manufacture, which produce noise and vibration in operation, and which are not well adapted for sudden changes in speed and direction of motion. These prior transmissions have usually applied a translating force to the movable holder at a point remote from, and off-set with respect to, the line of resistance of the work on the tool, with the result that the two oppositely directed and off-set forces tended to overturn the translated member, which tendency caused the member to cant and bind on its guideways. To resist these overturning and twisting forces, it has heretofore been necessary to provide widely spaced guideways for the movable member which required that the bed also be wide, thereby greatly adding to the cost of manufacture. In prior machines it has also been customary to have the translating mechanism connect with the movable member intermediate the spaced guideways which necessitated that a clearance aperture be formed lengthwise of the bed between the guideways through which either a portion of the member or a portion of the translating mechanism could extend to establish a connection between the member and said mechanism. It will readily be perceived that not only did this aperture greatly weaken the bed but also it permitted the ingress of dirt, chips, etc.

The primary object of this invention is to provide an improved machine tool which may be utilized for various operations, and to provide an improved translating mechanism for the movable member, which mechanism will be smooth and quiet in its operation, which will admit of more ready and precise change of speed and direction, which may be brought to rest with great precision, and which will be simple in construction and less costly to manufacture than prior devices.

This invention also has for an object to provide improved means for effecting translation between the work and the tool selectively at slow or rapid rates and to prevent binding of the translatable member on its ways. This object has been attained by applying a translating force to the movable member at a point substantially in line with the resisting force. With this arrangement one force acts directly against the other and there is no tendency of the movable member to overturn or to twist on its guideways, consequently there is no binding action and the member is maintained freely translatable on its ways. This elimination of the twisting and overturning tendency of the member permits the guideways to be located closer together than was practical in prior machines thereby permitting a reduction in the width of the bed with a proportionate reduction in cost of manufacture. The improved translating means is actuated by fluid pressure and automatic means is provided for so regulating and controlling the fluid pressure that the translatable member may be moved either slowly or rapidly and in either of two directions.

The fluid actuated translating means preferably comprises a pair of cylinders supported behind the member to be translated and at opposite sides of the center line thereof. Within each of these cylinders is fitted a piston and these pistons are connected with the translatable member in line with the resisting force, and also in alignment with the spaced ways on which the member is slidingly fitted. Means also is provided to admit fluid under pressure into the cylinder alternately at opposite ends of the piston thereby to translate the pistons and the member in reverse directions. The provision of a plurality of cylinders arranged as specified gives a four-fold advantage, (1st), they cause the translating power to be applied directly in line with the work and in direct opposition to the resisting force, thereby eliminating the tendency of the translatable member to overturn; (2nd) they cause the translating power to be applied equally at opposite sides of the member, in line with the spaced guideways, thereby precluding the tendency of the member to twist or cant on its ways; (3rd) placing the cylinders at opposite sides of the center line of the translatable member permits ready access to the end of a tool spindle, which may be journaled therein, thereby enabling the attendant to drive out a tool held in the spindle; (4th) by providing a plurality of cylinders, rather than a single cylinder, the size of the cylinders may be relatively small and yet afford the required piston area to produce the necessary working pressure from a relatively low pressure pump.

Another undesirable feature of prior machines having mechanical transmissions for the heads was that, due to lost-motion etc., it was impossible to bring the translatable member to rest with precision at predetermined points intermediate its extreme positions.

This invention also aims to provide automatic means to discontinue the actuation of the translating means thereby to bring the member to rest intermediate its extreme positions. A dead-stop device also is provided, and is adapted to be rendered effective in opposition to the translatory means to bring the translatable member to rest in predetermined positions with great precision.

Still another object of the invention is to provide a machine tool having two fluid actuated translatable members or heads, and to provide automatic means to control the flow of fluid to effect slow, rapid, forward and reverse movements to said members in a predetermined sequence. This object has been attained by mounting behind each of said members a pair of cylinders, within each of which is slidingly fitted a piston operatively connected with one of said heads. A continuously acting low pressure pump is adapted alternately to be connected with ports at the opposite ends of each of said cylinders whereby the direction of movement of the piston (and thereby the heads) may be reversed, and means actuated by the movement of the heads, is provided for determining which of said ports shall be connected with the pump. Automatically actuated means regulates the rate of flow of fluid into the cylinders whereby the rate of movement of said heads is accurately controlled and regulated. A by-pass also is provided to permit free and unobstructed circulation of fluid from the reservoir to the pump, and thence back to the reservoir when both of the heads are retracted to their inoperative positions.

Another object of this invention is to provide means whereby each of the heads may be adjusted bodily toward or from each other and yet receive their maximum movement under the influence of the translating mechanism regardless of their position of adjustment. This may be effected by having the heads adjustably connected with their translating pistons, whereby the heads may be shifted relatively to their actuating means, the extent of movement of the pistons in their respective cylinders remaining unchanged.

A still further object is to provide an improved drive for the tool spindles, rotatably journaled in the heads, and so to construct the drive that it may operate freely during translation of the heads and in all of their positions of adjustment on their guideways.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
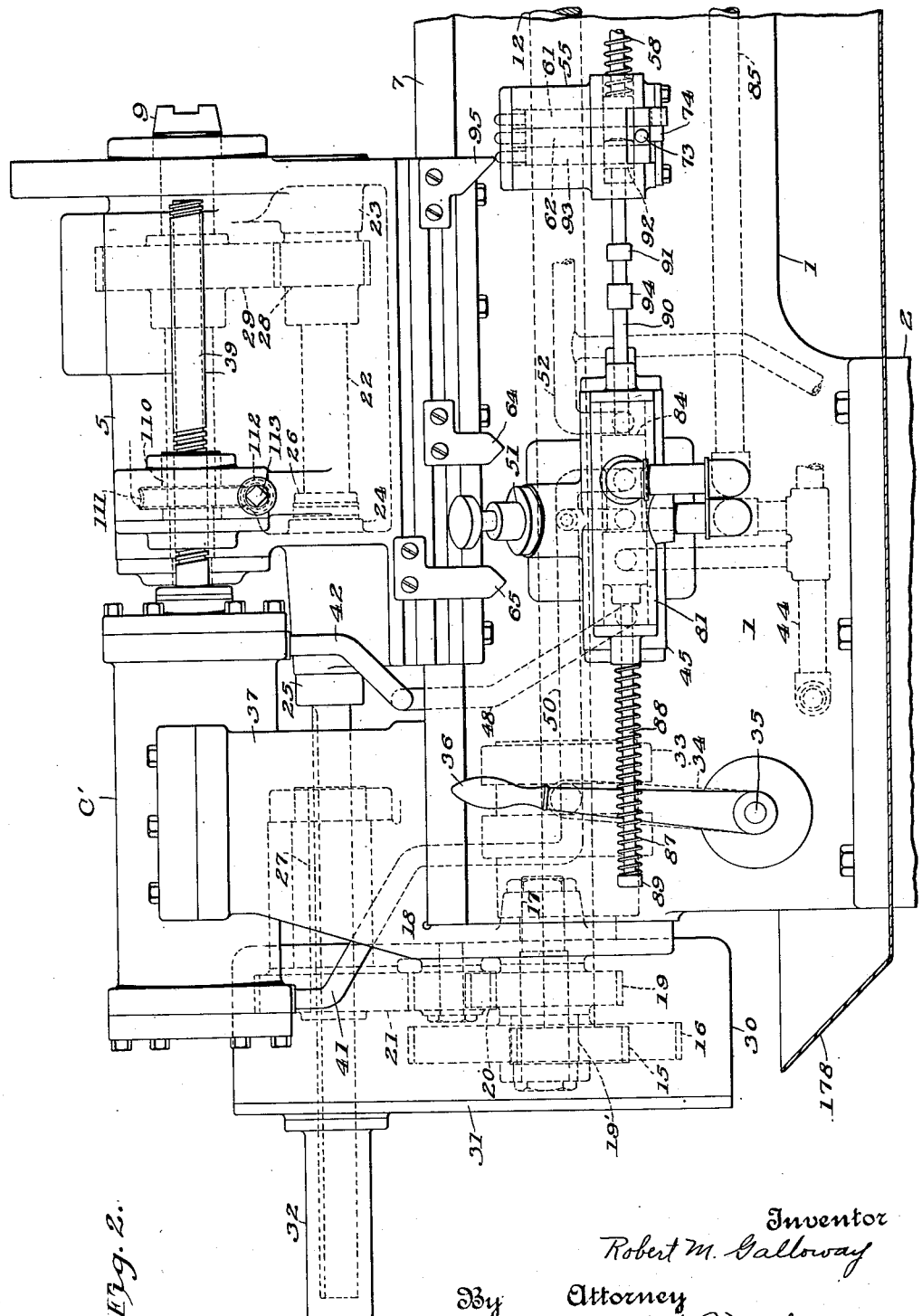
Figure 3:
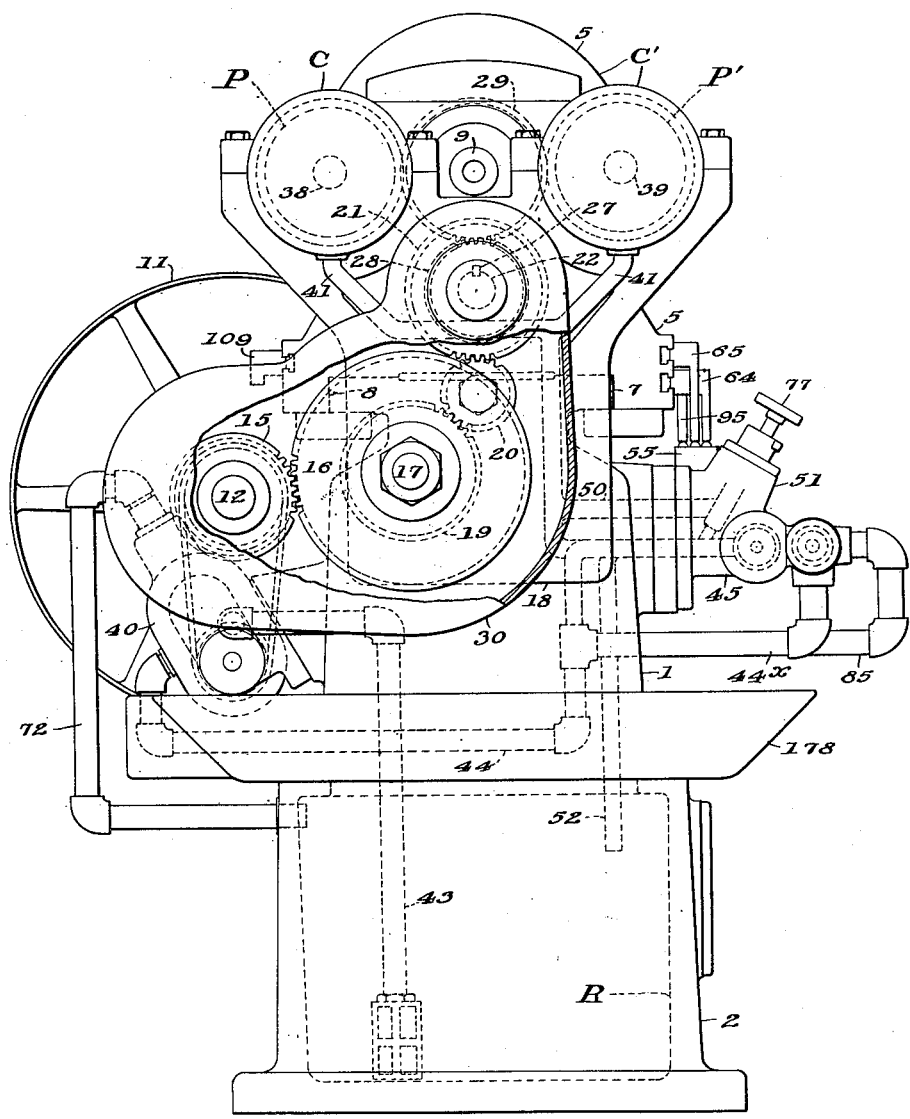
Figure 12:
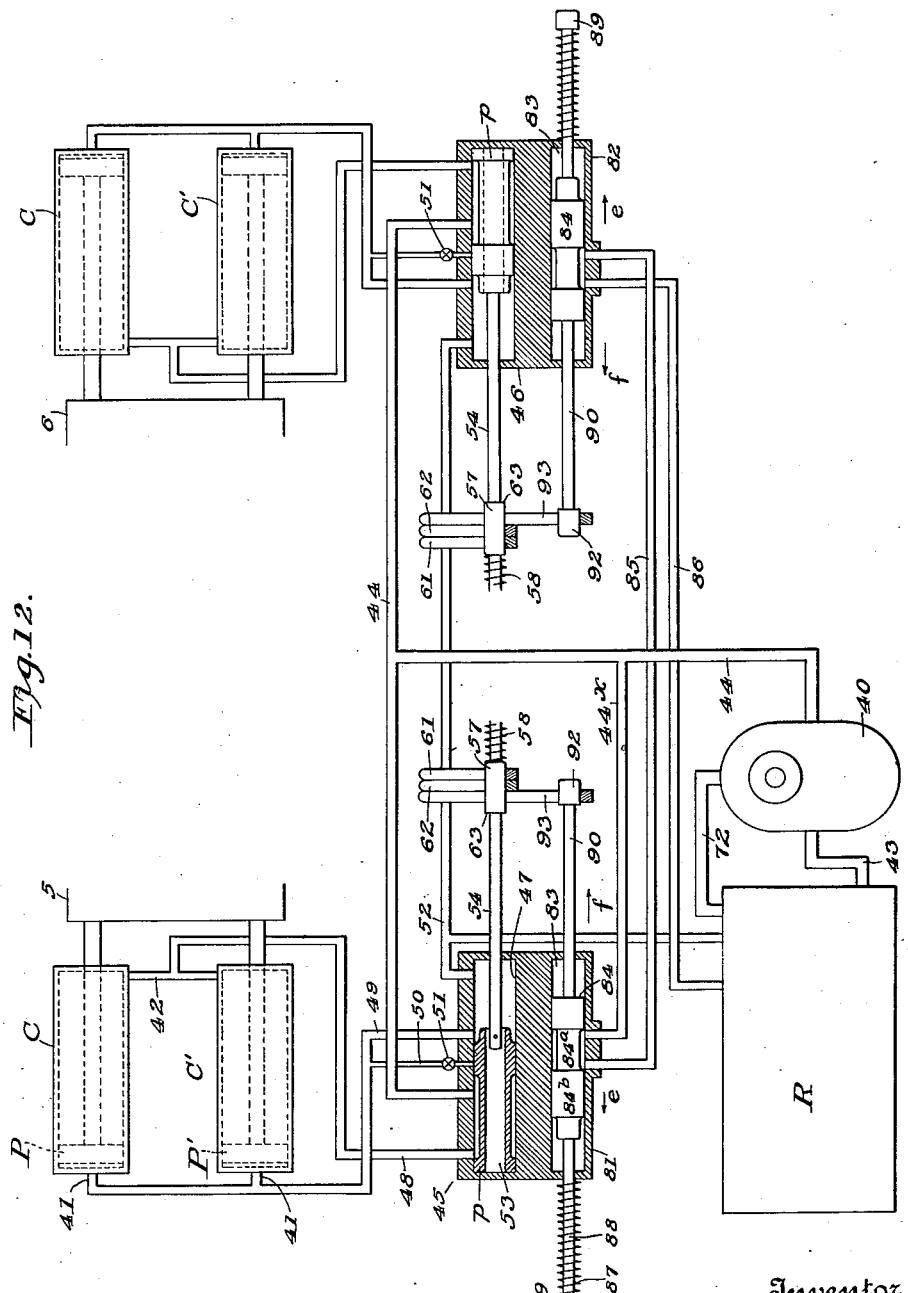

Figure 1 is a front side elevation of a machine tool embodying the present invention. Fig. 2 is an enlarged side view of the left end portion of the machine shown in Fig. 1. Fig. 3 is an enlarged left end view of Fig. 1. Fig. 4 is a plan of the mechanism shown in Fig. 2. Fig. 5 is an enlarged view of the right end of the machine shown in Fig. 1, as viewed from the rear side of the machine. Fig. 6 is an enlarged view of a portion of the left end of the machine shown in Fig. 1, showing more particularly a dead-stop device for limiting the movement of the translatable head. Fig. 7 is a left end view of a portion of Fig. 6. Fig. 8 is a plan, partly in section, of the automatic means for controlling the speed and direction of movement of the translatable heads. Fig. 9 is a detail view of a valve for determining the speed of translation of the heads during the tooling operation. Fig. 10 is a detail side elevation of automatic means for effecting step-by-step movement of the valve which controls the slow feed and rapid traverse of the translatable heads. Fig. 11 is a view along the line 11—11 of Fig. 10. Fig. 12 is a diagrammatic view illustrating the hydraulic transmission for the heads and the pump by-pass. Figs. 12ª and 12ᵇ are detail views of the valve which controls the translation of one of the heads, said figures showing the valve in its rapid forward traverse and slow forward feed positions respectively, together with the means for giving the valve step-by-step movements. Fig. 12ᶜ is a detail view of one of the by-pass controlling valves showing it in the position it occupies at all times except when the tool-head is completely retracted. Fig. 13 is a detail view of a modified means for actuating the main fluid-controlling valve. Fig. 14 is a detail section view of the control valve used in mechanism shown in Fig. 13. Fig. 15 is a sectional view of a second modified means for controlling the action of the main fluid-controlling valve. Figs. 16 and 17 are side and sectional views, respectively, of a third modified means for controlling the action of said valve. Figs. 18 and 19 are side and end views, respectively, of a fourth modified means for controlling the action of the main fluid controlling valve. Figs. 20, 21 and 22 are side views of fifth, sixth and seventh modified means for controlling the action of said valve.

Referring more specifically to the drawings, the invention is disclosed as embodied in a machine tool combining a bed 1 which may be arranged horizontally, as shown in Fig. 1. or at any desired angle. When arranged horizontally the bed is preferably supported upon spaced columns, or legs, 2 and 3 affording between them, and beneath the bed, an unobstructed space which provides ample foot-room for an operator, thereby enabling him to occupy his normal working position, at the side of the bed intermediate its ends, without interference.

As hereinbefore stated, this invention contemplates a work-holder and one or more tool-holders with means for effecting relative movement between the holders. For the purpose of this disclosure it will suffice to consider the member 4, supported upon the bed 1 intermediate its ends, as the work holder, and the heads 5 and 6 translatably mounted on guideways 7 and 8, provided by the bed, as tool holders. The tool-holders may carry any suitable tools for operating upon the work supported by the work-holder and the tools may be caused to act upon the work by means of the translating movement of the tool heads. For performing certain operations, such for example as drilling, reaming, facing, etc., the tools will preferably be given rotation in addition to their translation and to that end, they will be mounted in rotatable spindles 9 and 10 journaled in the heads 5 and 6 respectively, as disclosed in Figs. 1 and 2, which show each head equipped for drilling a single hole. It is to be understood, however, that various other rotatable tools may be secured to the spindles and also that multiple spindle tool-heads may be secured to the heads 5 and 6 and have their tool-carrying spindles rotated from the spindles 9 and 10.

Spindle rotating mechanism

Power to rotate the spindles 9 and 10 is preferably provided by a prime mover 11 adapted to be connected with a shaft 12, journaled lengthwise of the machine tool, by means of a master clutch 13 adapted to be actuated manually by a hand-lever 14. Inasmuch as the drives from the shaft 12 to the spindles 9 and 10 are identical, it is believed that detailed illustration and description of one drive will suffice. Referring more particularly to Figs. 2 and 3 it will be seen that upon the shaft 12 is secured a gear 15, which meshes with and drives a gear 16 fixed upon the hub 19' of a gear 19 rotatably journaled upon a stub-shaft 17, fixed within a member 18, secured upon the end of the bed 1. The gear 19 drives a pinion 20 which in turn drives a gear 21, the gears 20 and 21 also being rotatably journaled in the member 18. A jack-shaft 22 is rotatably journaled in bearings 23 and 24, provided by the translatable head, and is held against axial movement with respect thereto by thrust-bearings 25 and 26. The shaft 22 has a splined connection 27 with the gear 21 whereby the shaft is rotated by said gear and is permitted to have endwise movement with respect thereto. Fixed upon the jack-shaft is a pinion 28 which meshes with and drives a gear 29 secured upon the spindle 9. From the foregoing it will be perceived that means has been provided for effecting rotation of the spindle 9 in all the positions of the head 5 lengthwise of the base 1. The spindle 10, journaled in the head 6, is rotated in like manner. The member 18 provides a casing 30 within which the gears 15, 16, 19, 20 and 21 are housed. This casing may be closed by a removable cover-plate 31 which carries a tubular guard 32 for the shaft 22. By removing the cover-plate 31 access may be had to the gears within the casing 30, thereby permitting removal of the gears 15, and 16, and their replacement by gears of different ratio, for varying the speed of the spindle 9 from a constant speed in the shaft 12.

In addition to the master control, comprising the clutch 13 and actuating lever 14, means is provided for effecting individual rotation of the spindles 9 and 10 from the shaft 12. To this end each of the gears 15 is adapted to be connected with the shaft 12 by means of a clutch 33 adapted to be actuated by an arm 34 fixed upon a shaft 35 journaled transversely of the bed 1. Hand levers 36, secured to the shafts 35 at the front side of the machine, serve to effect manual manipulation of the clutches 33. These clutches may also be shifted automatically as will hereinafter be explained.

Fluid actuated head-translating means

Relative movement between the tools and the work is preferably obtained by translating the tool-heads 5 and 6 on the bed 1. To effect this translation at either slow or rapid rates, without noise or vibration, without complicated and costly mechanism and in such a manner as to eliminate the twisting strains that heretofore have tended to cause the head to bind on its ways, is one of the objectives of this invention. Referring to Fig. 1 it will be seen that, as the tool-heads are moved toward the work, the tools will exert a pressure on the work in the direction indicated by the arrows $a$. Inasmuch as the work is fixed it will offer a resisting force on the tools in the direction indicated by the arrows $b$. Now it will readily be perceived that if the power to translate the heads is applied thereto at a point materially out of line with the resisting force, such for example as down between the guides 7 and 8, the resisting force will tend to overturn the heads backwardly. It will also be understood that where the translating force is applied to the heads at a single point out of line with the resisting force the resistance offered by the work on the tools will tend to produce a twisting strain on the heads causing them to bind on their guideways thereby precluding easy translation thereof.

I have overcome the inherent defects and undesirable features of prior machines and have attained the objects of this invention by the provision of an improved fluid actuating translating mechanism for the tool heads. Inasmuch as the translating mechanisms for the heads 5 and 6 are identical, detailed illustration and description of one is deemed sufficient. It is also to be remembered that this head translating means is equally well adapted to a machine tool having a single head and therefore a disclosure, with reference to one head, is complete.

Supported behind the tool head, as by means of a standard 37, forming a part of the member 18, are a pair of twin cylinders C and C' within which are slidingly fitted pistons P and P' secured upon piston rods 38 and 39 attached to the tool-head at opposite sides of the axis of the spindle. These cylinders are preferably arranged above and in line with the guideways 7 and 8 and therefore movement of the piston rods 38 and 39, by means of fluid pressure admitted into the cylinders, transmits to the tool-head working forces parallel with said guideways. The arrangement of the cylinders in line with the axis of the tool spindle causes the translating force to be applied directly behind the tool and in direct opposition to the resisting force offered by the work. Thus the tendency of the head to overturn or to twist on its guideways is effectively precluded and therefore the guides 7 and 8 may be arranged materially closer together than has been practical in prior machines with a result that the entire bed may be made narrower, thereby greatly reducing the cost of manufacture. Fluid pressure to translate the pistons P and P' in the cylinders C and C' is preferably provided by a constantly acting low pressure pump 40, driven from the shaft 12. This pump draws fluid, preferably oil, from a reservoir R formed in the leg 2 and forces it alternately into the opposite ends of said cylinders through pipes 41 and 42. The means for controlling the rate and direction of flow of fluid from the pump into the cylinders will hereinafter be described. Inasmuch as the means for translating the heads connect with said heads adjacent the tool spindle the bed may be formed with an unbroken upper surface connecting the guides 7 and 8 and thereby materially strengthening the bed and precluding the entrance of chips, dirt, etc.

The provision of a plurality of cylinders and complemental pistons arranged as shown and described permits access to the rear end of the hollow spindle whereby the operator readily may drive out the tool or other member fitted therein.

Automatic control of head translating means

In the operation of machine tools of this nature it is desirable that means be provided rapidly to traverse the head to bring the tool, or tools, to the work, that thereafter the head be fed slower, or at a rate commensurate with the operation being performed, and that after the operation is completed the head again be retracted at a rapid rate. This invention provides improved automatic means for controlling the rate and direction of flow of fluid into the cylinders C and C'. This automatic control is illustrated more particularly in Figs. 1, 2, 8, 9, 10, 11 and 12. As hereinbefore stated the pump 40 is of the constant flow low pressure type and is actuated whenever the shaft 12 is rotated by the prime mover. This pump has an intake pipe 43, connected with the reservoir, and an outlet pipe 44 connects with flow-controlling and distributing valves 45 and 46 for the heads 5 and 6 respectively. Inasmuch as the construction and manipulation of both of the valves 45 and 46, whereby they control the rate and direction of movement of the tool heads, are identical, it is believed that detailed illustration and description of one is sufficient.

The outlet pipe 44 connects with a cylinder 47 within which is slidingly fitted a piston $p$ formed with a reduced central portion affording an annular passage for fluid entering the cylinder through the pipe 44. Also connected with the cylinder 47, is a pipe 48 which extends to the forward end of the cylinders C and C' and terminates in the pipes 42 hereinbefore referred to. Rapid traverse and slow feed pipes 49 and 50, respectively, also connect with the cylinder 47. These pipes merge together and connect with the cylinders C and C' as by means of the pipes 41. The pipes 48 and 49 are adapted to carry the entire output of the pump 40 and therefore when either of these pipes is connected with the pipe 44 the flow of fluid into the cylinders C and C' is rapid and the pistons P and P' and the tool head connected therewith are translated rapidly. A valve 51, connected with the pipe 50, materially reduces the flow through that pipe and therefore when the flow is through the pipe 50, the movement of the head will be relatively slow and in a forward direction. This slow forward movement is used to effect the working operation. An exhaust pipe 52 connects the valves 45 and 46 with the reservoir thereby permitting expulsion of the fluid from the end of the cylinders toward which the pistons are moving. The valve piston $p$ is formed with an axial bore 53 which permits the cylinders to exhaust through the pipe 48 and said bore and thence through the pipe 52 when the valve piston 48 is in a position to effect forward movement of the head either at a rapid or at a slow rate, as shown in Figs. 12$^a$ and 12$^b$, respectively. When the head is moved rearwardly the cylinders exhaust through the pipes 49 and 52 as shown in Fig. 12.

Movement of the valve piston $p$, to establish communication between the inlet pipe 44 and either the rapid forward traverse pipe 49, the slow forward feed pipe 50 or the rapid reverse traverse pipe 48, may be effected by any suitable or preferred means. This invention contemplates various mechanisms for performing this movement of the valve pistons but the preferred form is that illustrated in Figs. 1, 2, 3, 4, 8, 9 and 10 now to be described.

Each of the pistons $p$ is connected to a rod 54 slidingly fitted in brackets 55 and 56 provided by the bed 1. A collar 57 is secured to each of the rods 54 and interposed between each of the collars and the brackets 56 is an expansile spring 58 which normally tends to shift the rod 54, and thereby the valve piston, to a position to establish communication between the pressure pipe 44 and the rapid return traverse pipe 48 as shown in Figs. 8 and 12. Yieldingly supported within the bracket 55 and normally pressed upwardly by springs 59 and 60 are interference members 61 and 62 adapted, in their uppermost positions, to lie within the path of a shoulder 63 provided by the collar 57, thereby to limit the movement of the rod 54 and valve piston $p$ under the influence of the spring 58. The members 61 and 62 are formed with upstanding portions 61$^a$ and 62$^a$ adapted, during the translation of the head, successively to be depressed by dogs 64 and 65, respectively, adjustably secured to the head, thereby to cause said interference members successively to be moved out of the path of the collar 57 to permit the rod 54 and valve piston $p$ to be shifted under the action of the spring 58 for a purpose hereinafter to be explained.

To each of the rods 54 is secured a handle 66 which afford means for individually actuating the valves 45 and 46 whereby either of the heads 5 or 6 may be actuated independently of the other. Means also is provided for shifting the rods 54 simultaneously to render effective the translating means for both heads. This means comprises a hand lever 67 fixed upon a shaft 68 journaled in the bed 1, substantially mid-way between its ends. To this shaft is also secured oppositely extending arms 69 connected, by links 70, to studs 71 projecting from the rods 54. Thus, by movement of the lever 67 about the axis of the shaft 68, the arms 69 and links 70 simultaneously will draw the rods 54 toward shaft 68 to start the automatic translation of the tool heads 5 and 6 as will hereinafter be more fully explained. The links 70 have lost-motion connections with the rods 54 thereby permitting the rods to be shifted individually by the levers 66.

*Operation of head translating mechanism*

Inasmuch as the head translating mechanism acts upon the tool heads 5 and 6 in like manner it is believed that detailed description of the operation of one head will suffice. Supposing that the head 5 is in its retracted position as shown in Fig. 1, that the work has been secured upon the work-support 4, and that suitable tools have been inserted in, or otherwise operatively connected with, the spindle 9, the operation is as follows:—The operator, by manipulating either the handle 66 or the lever 67 moves the rod 54 lengthwise in opposition to the spring 58. This movement of the rod shifts the valve piston $p$ to the position shown in Fig. 12$^a$ in which the pressure line 44 is connected with the rapid forward traverse pipe 49. As the rod 54 moves in the direction of the arrow $c$ Fig. 12$^a$ the interference members 61 and 62 are moved upwardly by the springs 59 and 60 as they are cleared by the shoulder 63, thus preventing return movement of the piston under the action of the spring 58. With the piston in the position shown in Fig. 12$^a$ the entire out-put of the pump flows through the pipes 49 and 50 into the rear end of the cylinders C and C' thereby effecting rapid forward traverse of the tool head toward the work. As the tool approaches the work the dog 64, carried by the head, depresses interference member 61 thereby releasing the shoulder 63 of the collar 58 and permitting the rod 54 and valve piston to be moved in the direction indicated by the arrow $d$ by the spring 58, into the position shown in Fig. 12$^b$ where they are temporarily retained by reason of the contact of the shoulder 63 against the interference member 62. The head now continues to move forwardly but at a materially slower rate due to the fact that the valve 51 in the pipe 50 permits only a limited flow of fluid through that pipe. This slow forward movement is utilized to effect the working operation which may be effected either by a rotating or non-rotating tool. During this slow forward motion of the head only a small portion of the out-put of the pump passes through the pipe 50 the remainder passing through a relief line 72 extending from the pump back to the reservoir (see Figs. 3 and 12).

The dog 65, adjustably mounted on the head, is arranged to come into contact with and depress the interference member 62 when the head has been moved sufficiently far to complete the tooling operation. Upon depression of the member 62 (which causes it to release the collar 57) the rod 54 and piston $p$ are again moved in the direction of the arrow $d$, by the spring 58, to the position shown in Figs. 8 and 12, in which position the pressure pipe 44 is connected with the pipe 48 which enters the forward end of the cylinders C and C'. The pipe 48 also is adapted to transmit the entire output of the pump and therefore the head is given a rapid traverse backwardly to remove it from the vicinity of the work.

At certain times, such for example as upon the breaking of a tool, it is desirable to discontinue the forward movement of the head before the tooling operation is complete and to retract the head to its inoperative position. To that end manual means is provided for depressing the members 61 and 62 to cause them to release the collar 57 thereby permitting the rod 54 and valve piston $p$ to move, under the influence of the spring 58, to head reversing position. This is effected by means of a hand lever 73 secured to the member 62. The interference member 61 carries a stud 74 which underlies the member 62, therefore depression of the lever 73 simultaneously depresses both of the members 61 and 62 and thereby releases the collar 57.

As hereinbefore stated the flow of fluid through the pipe 50 is controlled by the valve 51 which may be formed integral with the casing of the valve 45 and constructed as shown in Fig. 9. It has been found inadvisable to permit the operator to have complete control of the valve 51 to effect various speeds during the working operation therefore the valve is preferably set by the manufacturer to produce the maximum speed for which the machine tool is adapted. The operator may however reduce this speed to suit any particular tooling operation. This conveniently may be effected by utilizing a so-called needle valve in which the flow of fluid is controlled by the axial position of a rod, as 75, having a tapered end 75$^a$ adapted to cooperate with a valve seat 76, the proximity of the end 75$^a$ to the seat determining the flow of fluid. The rod 75 may be threaded through a nut 79 supported by the casing and a hand wheel 77 may serve to rotate the rod to effect axial adjustment thereof. The extreme outward position of the rod, and thereby the extreme open position of the valve, may be predetermined by means of a stop screw 78 threaded into the nut 79 and having a shoulder overlying a shoulder 75$^b$ provided by the rod 75. A set screw 80 serves to prevent adjustment of the screw 78. On certain classes of production work it has been found desirable to provide only one fixed feed, without any adjustment. This may be effected by replacing the needle valve and its cooperating seat with a plate having an aperture of the required size to give the desired feed.

Pump relief by-pass

In the operation of machine tools considerable time is required to remove the complete work, to replace it with a new piece, and to get the new piece properly set up for a subsequent operation. In prior hydraulically operated tools it has been customary to provide a relief line, controlled by a suitable relief valve which would open only when considerable pressure was applied thereto, to pass the output of the pump during the time that the finished work was being removed and new work was being set up. This necessitated the pump acting, during that time, against the back pressure of the relief valve which resulted in the consumption of a substantial amount of power and also in heating of the fluid.

This invention overcomes these difficulties by providing a free and unobstructed fluid by-pass adapted to be rendered effective only when both heads have been completely retracted, thereby permitting the pump to operate continuously without back pressure during the removal and replacement of the work. The opening and closing of this by-pass is preferably effected automatically and in timed relation with the movement of the heads. This by-pass and its control will be better understood by referring more particularly to Figs. 1, 8, 12 and 12$^c$. By-pass valves 81 and 82 are associated with the heads 5 and 6 respectively. Each of these valves comprises a cylinder 83 and a piston 84, movable therein and formed with a reduced intermediate portion which affords a fluid passage 84$^a$. A branch line 44$^x$ connects the pressure line with the cylinder of the valve 81 and forms the initial element of the by-pass. The valves 81 and 82 are connected together in series by means of a pipe 85 for a purpose later to be explained. A drain pipe 86 connects the cylinder of the valve 82 with the reservoir R. It will readily be perceived that with the parts in the positions shown in Fig. 12, in which the heads 5 and 6 are shown completely retracted, the entire output of the pump may flow through pipe 44, branch line 44ˣ, passage 84ⁿ in the valve 81, pipe 85, passage 84ᵃ in the valve 82 and then through the drain 86 back to the reservoir.

The valve pistons 84 are normally forced in the direction indicated by the arrows e (Fig. 12) by means of expansile springs 87 surrounding rods 88 (attached to one end of said pistons) and interposed between the cylinders 81 and 82 and collars 89 secured upon said rods. The pistons 84 also have secured to them rods 90 to each of which are secured collars 91 and 92. As the valve pistons P are moved to their positions in which they effect rapid forward traverse of the tool heads the pistons 84 are moved in the direction indicated by the arrows f to the position shown in Fig. 12ᶜ, in which position cylindrical portion 84ᵇ, of the pistons 84, close the pipe 85 and thereby prevent flow of fluid through the by-pass. Spring pressed interference members 93, similar in construction and operation to the members 61 and 62, are adapted to be moved into the path of the collars 92 to hold the pistons 84 in their by-pass closing positions, in opposition to the springs 87. Shifting of the pistons 84 with the pistons p is preferably effected by means of arms 94 fixed to the rods 54 and slidingly fitted to the rods 90. As the rods near their final position to effect rapid forward traverse of the heads the arms 94 contact with the collars 91 and effect translation of the rods 90. The pistons 84 are held in their positions wherein they prevent flow through the by-pass 85 during the time that the heads 5 and 6 are in their operative positions. As the heads are retracted to their inoperative positions as shown in Fig. 1 dogs 95, carried by the heads, depress the interference members 93 causing them to be moved out of the paths of the collars 92 thereby permitting the rods 90 and pistons 84 to be moved by the springs 87 to the position shown in Fig. 12. This movement of the pistons opens the by-pass thus permitting the pump to exhaust idly therethrough thereby bringing the heads to rest.

Connecting the by-pass valves 81 and 82 in series insures that both heads will be fully retracted before they are brought to rest. Even though one head should be fully retracted and its relief valve opened no flow of fluid may take place through the by-pass until the other head also has been retracted and its by-pass valve opened.

Dead-stop for heads

Although it has been found by actual test that in a machine embodying this invention the forward movement of the heads automatically may be stopped accurately to within .005 inch, nevertheless certain operations require even greater accuracy. To enable the heads to be brought to rest with great precision, there has been provided a dead-stop device which may be built into the machine or which may be applied thereto as an attachment for either or both of said heads. This device is shown in Figs. 6 and 7 and comprises a rod 96 secured to and movable longitudinally with the tool-head, a member 97 secured to said rod and affording a stop-shoulder, and a non-translatable abutment member 98 adapted to be moved into the path of said shoulder to arrest the movement of the tool-head in opposition to the impositive fluid-actuated feed. The rod 96 is preferably non-translatably connected to the tool-head by means of its attachment to a bracket 99 secured to the head. When the dead-stop device is effective the translating force of the feed is resisted by a bracket or standard 100 secured to the standard 37 which supports the cylinders C and C'. The member 97 affording the stop shoulder may be of any suitable form such for example as a collar adjustably secured to the rod 96, or as shown in the drawings, by a nut adjustably threaded on said rod and held in adjusted positions by a lock nut 101. The rod 96 passes through a bore 102 in the standard 100, which bore is sufficiently large also to permit passage of the nut 97 therethrough when the dead-stop device is not being used. Pivotally mounted upon the bracket 100, as by means of its attachment to a rod 103, is the abutment member 98 which is adapted to be swung into the path of the stop member 97. This member 98 preferably rests against a finished face 100ˣ of the bracket 100 and transmits thereto the pressure exerted by the hydraulic feed.

For certain operations it is desirable to be able to bring the head to rest accurately in a plurality of predetermined positions. To meet this desideratum the member 98 may be formed with two or more portions 98ᵃ and 98ᵇ of unequal thickness as shown in Fig. 6. The abutment portions may be swung into and out of the path of the shoulder 97 by oscillating the rod 103 which, for convenience of operation, preferably extends to a position adjacent the tool and is provided with an actuating handle 104.

Automatic throw-in and throw-out for spindle rotation

As hereinbefore stated the spindle rotating means for each spindle is controlled by a clutch 33 which may be actuated individually by hand levers 36 at the front of the machine and also automatically. The automatic means for shifting one of the clutches 33 is shown in Fig. 5 and inasmuch as the mechanism is the same for both clutches illustration and description of one will suffice. Fixed to the bed 1 adjacent the guideway 8 is a bracket 105 upon which is fulcrumed at 106 a threearmed T-lever 107. The arm 107ª of the lever is connected by a link 108 to the clutch shifting arm 34 hereinbefore referred to. The arms 107ᵇ and 107ᶜ lie within the path of a dog 109 adjustably secured upon the tool-head. Upon forward movement of the head the dog 109 contacts with and depresses arm 107ᶜ thereby swinging the arm 107ª clockwise and shifting the clutch 33 to effect a spindle drive. As the tool head is retracted the dog passes over the then depressed arm 107c and engages the arm 107ᵇ thus shifting the arm 107ª counter-clockwise and shifting the clutch to discontinue the spindle drive.

Axial adjustment of tool heads

The tool-heads may be adjusted bodily with respect to their translating means for purposes hereinbefore explained. This may be effected by having the piston rods 38 and 39 adjustably connected with the tool-heads. One means for adjustably connecting the rods with the heads is shown in the drawings and consists in having the rods threaded through nuts 110 rotatably but non-translatably journaled in the tool-heads, with means to effect relative rotation between the nuts and the screws. This invention also proposes means simultaneously and synchronously to effect adjustment between both of the rods 38 and 39 and their respective nuts. This preferably comprises worm wheels 111 connected to each of the nuts 110 and worms 112 secured upon a shaft 113 journaled in the tool-head transversely thereof and adapted simultaneously to rotate the worm wheels 111 and nuts 110. The forward end of the shaft 113 is squared to receive a suitable actuating crank or wrench.

Modified head controls

As hereinbefore stated this invention proposes various means for controlling the fluid-actuated head translating mechanism. The first modified means, shown in Figs. 13 and 14, is adapted automatically to effect continuous reciprocation of the tool-head. To that end the piston $p$ has secured to it (at the end opposite to that to which the rod 54 is attached) a rod 114 which extends into a cylinder 115 and carries a piston 116. Pipes 117 and 118 connect with the cylinder 115 at opposite ends thereof. These pipes are adapted alternately to be connected with a pressure pipe 119 which in turn is connected in any suitable way to the pressure line 44. An oscillatory valve 120, formed with ports 120ª and 120ᵇ is normally held in the positions shown in Figs. 13 and 14 by means of a spring 121, and in that position connects the pressure pipe 119 with the pipe 118 and the pipe 117 with a drain pipe 122. Fluid pressure entering the cylinder 115 through the pipe 118 tends to move the rod 114 and thereby the piston $p$ in the direction indicated by the arrow $d$ thereby shifting the piston $p$ to the position shown in Fig. 8 which effects a rapid retraction of the tool-head. Thus it will be seen that fluid pressure may be utilized instead of the spring 58 to shift the piston $p$. This mechanism also may replace the manual means for shifting the piston $p$ to effect forward translation of the head. Upon retraction of the tool-head, a pin 123 carried by the tool head engages an arm 124 attached to the valve 120 thereby shifting the valve in the direction indicated by the arrow $x$ and effecting communication between the pressure pipe 119 and the pipe 117. Fluid entering the cylinder 115 through the pipe 117 shifts the pistons 116 and $p$ in the direction indicated by the arrows $c$ to initiate a new cycle. The interference members 61, 62 and 93 and the dogs 64, 65 and 95 operate as hereinbefore described to effect step-by-step movement of the piston $p$ to produce the desired rate and direction of translation in the tool-head. For certain operations, such for example as when drilling through spaced walls, it is desirable to give the tool head (1) a rapid forward traverse to bring the tool to the work (2) a slow forward feed while drilling through the first wall (3) a second rapid forward traverse rapidly to bring the tool to the next wall (4) a slow forward feed while drilling the second wall and (5) a rapid return to remove the tool from the work. This may be effected by the valve illustrated in Fig. 15 in which the piston $pp$ is adapted to be moved step-by-step in the direction indicated by the arrow $t$ successively to effect a flow of fluid from the pressure line 44, through the forward traverse pipe 125, forward slow feed pipe 126 (both of which enter the rear ends of the cylinders C and C') and the return traverse pipe 127 which enters the forward ends of said cylinders  With this device four interference members and cooperating dogs will control the movement of the piston but inasmuch as they operate in the same manner as the members 61 and 62 and dogs 64 and 65 illustration thereof is deemed unnecessary. In moving in the direction indicated by the arrow $t$ the piston will successively effect communication from the pressure line to the forward traverse, forward feed and return traverse pipes as indicated by the arrows $g, h, i, j,$ and $l$.

Figs. 16 and 17 show another modified means for controlling the movement of the tool head. This means consists of a rotary valve adapted to connect the pressure line 44 successively with rapid forward traverse pipe 49 the forward slow feed pipe 50 and the return traverse pipe 48. The valve consists of a circular disk 128, provided with a port 129 permanently communicating with a pressure chamber 130 in a stationary casing 131 secured to the bed of the machine. This port is, during step-by-step rotation of the disk, adapted to effect communication between the pressure chamber 130 (which receives fluid pressure from the pressure line 44) and the pipes 48, 49 and 50. The disk 128 is also formed in one face with an arcuate channel 132 which serves to connect the then exhausting lines with a drain 52. A coil spring 133 located within the pressure chamber 103 has one end attached to the casing 131 and the other end to the disk 128 and normally tends to rotate the disk in the direction indicated by the arrow $v$, Fig. 16. To control the step-by-step rotation of the disk thereby to effect the desired rate and direction of translation of the tool-head the disk is clutched to a stub shaft 134 to which also is attached an annular member 135 which is urged in the direction indicated by the arrow $v$, with the disk. The member 135 carries a plurality of stops 136, 137 and 138 which, in the rotation of the member, are adapted to come into contact with spring pressed pawls 139, 140 and 141 respectively. These pawls are arranged in the paths of suitable dogs adjustably carried by the tool head and therefore the pawls may be depressed successively to release the member 135 to permit it, and the disk, to rotate under the influence of the spring 133. A hand lever 142 serves to rotate the member 135 and disk 128, against the action of the spring, to start a new cycle.

Still another means for controlling the movement of the piston $p$ in accordance with the movement of the tool-head is illustrated in Figs. 18 and 19. In this form a rod 143 is carried by the piston $p$ and is urged therewith in the direction indicated by the arrow $w$ by any suitable means such for example as the spring 58. Rotatably journaled in bearings 144 (only one of which is shown) provided by the bed 1, is a rod 145 formed with a helical groove 146 which receives a stud 147 carried by a bracket 148, supported by the tool-head. It will readily be perceived that translation of the tool-head will, through the action of the stud 147 and groove 146, effect rotation of the rod 145. This rotation is utilized to actuate the piston controlling means which comprises disks 149 and 150 rotatably journaled on the hub 151 of a collar 152 secured upon the rod 145. The collar 152 and the disk 150 carry pins 152$^a$ and 150$^a$, respectively, which project into arcuate recesses 150$^b$ and 149$^b$ milled in the faces of the disks 150 and 149. Upon forward movement of the head the pins each engage a closed end of its complemental recess and therefore the rod 145, collar 152 and disks 150 and 149 all rotate together. The disk 149 provides a bearing surface 149$^a$, which terminates at 149$^c$, against which the rod 143 bears when the piston $p$ is in its position to effect forward traverse of the tool-head. As the tool-head moves upwardly the pin 147 and groove 146 effect rotation of the rod 145 and the disks 149 and 150 in the direction indicated by the arrow $y$, with the result that the shoulder 149$^c$ is moved out of the path of the rod 143 which then moves into contact with the surface 150$^c$ of the disk 150, as shown in Fig. 18. This movement of the rod 143 shifts the piston $p$ to a position in which it effects slow forward feed of the tool-head. Continued forward movement of the head continues to rotate the rod 145 as indicated by the arrow $y$ until the surface 150$^c$ is moved out of the path of the rod 143, again permitting the rod to move in the direction of the arrow $w$ into contact with the collar 152 thereby shifting the piston to effect rapid retraction of the tool-head. As the head is retracted the rod 145 is rotated in the reverse direction but springs 153 and 154, having their opposite ends connected to the hub of the collar 152 and to the disks 149 and 150, respectively, permit the pins 152$^a$ and 150$^a$ to recede in the recesses without effecting rotation of the disks. This is necessary inasmuch as the rod 143 is then in the path of the shoulders 149$^c$ and 150$^d$ thereby preventing return of said disks. When the piston $p$ is moved to effect forward traverse in a succeeding operation the rod 143 is moved out of the path of said shoulders 149$^c$ and 150$^d$ and the disks are returned to their operative positions by the springs 153 and 154.

Fig. 20 illustrates another means for shifting the rod to which the piston $p$ is connected. This consists of a bell-crank lever 160 fulcrumed upon a stud 161, secured in the bed 1, and a cam plate 162 adjustably secured to the tool-head and adapted to shift said bell crank lever. The lever 160 has one arm 160$^a$ connected with piston shifting rod 54 and another arm 160$^b$ which carries a roller 163 adapted, upon translation of the head, to engage cam portion 162$^a$ and 162$^b$ to effect oscillation of said lever and thereby translation of the fluid controlling piston.

For quantity production a machine tool is set up to perform a certain cycle, then after the required number of parts have been made it may be used for certain other operations. It is desirable however to be able later to set up the machine again to perform the first named cycle. This invention provides simple and efficient means whereby this may be acomplished. As shown in Figs. 21 dogs 64$^x$, 65$^x$ and 95$^x$ may be permanently arranged on a bar 164 which may be secured to the toolhead. These dogs act upon the interference members 61, 62 and 93 in the same manner as do the dogs 64, 65 and 95, but it will be readily perceived that they may be removed from the tool head and subsequently attached thereto to repeat the previous operation of the machine.

Fig. 22 also shows a modified means for automatically shifting the rod 54 which translates the piston $p$. This means comprises a single spring pressed interference member 165 having three vertically spaced abutment shoulders 166, 167 and 168 adapted in the various vertical positions of the member 165 successively to lie within the path of and obstruct the movement of the collar 57 on the piston controlling rod 54. The interference member 165 may be given a series of depressions to cause the shoulders successively to release the collar 57, by dogs 169, 170 and 171, each of which is longer than the preceding one.

Coolant transmission

As hereinbefore stated this invention also provides improved means for holding a cooling fluid for the tools, for transporting the coolant to the tools and for returning the unused coolant to the reservoir. The leg 3, which supports one end of the bed is preferably utilized as a reservoir for the coolant fluid. This eliminates the provision of separate means to hold the coolant and takes up no additional space. Coolant may be drawn from the reservoir T by a pump S which may be driven in any suitable way, such for example as by the shaft 12 (see Fig. 5) and which has an intake pipe 175 extending into the reservoir and an outlet pipe 176 which terminates in nozzles 177 adjacent the tools. Intermediate the bed 1 and the legs 2 and 3 is a drip pan 178 which catches the unused coolant and returns it to the reservoir T through a pipe 179, (Fig. 1).

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A machine tool combining a support; a head translatably mounted on said support; fluid actuated means for translating said head on said support, said means comprising two cylinders supported back of said head and at opposite sides of the center line thereof; a piston movable in each of said cylinders, means to admit fluid under pressure into said cylinder, a threaded rod connected with each of said pistons, two nuts rotatably but non-translatably journaled in said head, each having a threaded engagement with one of said threaded rods, a rotatable shaft journaled in said head transversely of the axes of said cylinders and having an operative connection with both of said nuts; and means to rotate said shaft to effect simultaneously rotation of said nuts and thereby relative adjustment of said heads and said pistons.

2. A machine tool combining a support; a member translatably mounted on said support; a member rigidly secured to said support; fluid actuated means to translate the first named member; a dead-stop device for limiting the movement of said translatable member, said device comprising a first bracket secured to the translatable member; a second bracket secured to the stationary member; a rod fixed to said first bracket and extending through an aperture in the second bracket; an element adjustably secured to said rod and affording a stop shoulder; and an abutment member pivotally mounted adjacent the bracket on the stationary member and adapted to be swung into the path of said stop shoulder to transmit to said last named bracket the pressure of said translating means.

3. A machine tool combining a support; a head translatably mounted on said support; a standard secured to said support; a cylinder secured to said standard; a piston movable in said cylinder; an operative connection between said piston and said head; means to admit fluid under pressure into said cylinder to effect translation of said piston and said head; a dead-stop device to arrest the movement of said head before it has received its extreme movement under the influence of the fluid pressure, said device comprising a rod movable with said head; a collar secured to said rod, said rod and collar normally passing through an aperture in said standard when the head is given its extreme movement; an interference member adjacent said standard and adapted to be moved into the path of said collar; and means operative, by the attendant, from a position adjacent the face of said head remote from said standard to move said interference member into and out of its operative position.

4. A machine tool combining a support; a plurality of heads translatably mounted thereon; a spindle rotatably journaled in each of said heads; a prime mover; a power shaft rotated by said prime mover; an extensible drive between said shaft and each of said spindles thereby to effect rotation of said spindles in all of the positions of said heads on said support, each of said drives including a clutch; manual means for selectively actuating each of said clutches; automatic means for actuating said clutches to discontinue rotation of said spindles at a predetermined point in the translation of said heads; and means to disconnect said power shaft from said prime mover.

5. A machine tool combining a support;

a plurality of heads translatably mounted thereon; fluid actuated means to translate said heads; a spindle rotatably journaled in each of said heads; a power shaft; an extensible drive between said shaft and each of said spindles, thereby to effect rotation of the spindles in all of the positions of said heads on said support; means actuated by the movement of each of said heads in one direction to render its spindle rotating means effective; and means actuated by the movement of each of said heads in the opposite direction to discontinue the rotation of the spindles.

6. A machine tool combining a translatable head; a pair of cylinders located behind said head; a piston movable in each of said cylinders; an operative connection between each of said pistons and said head; a fluid pressure line; two fluid conduits of unequal capacity connected with both of said cylinders at one end thereof; a third fluid conduit of large capacity connected with the other ends of said cylinders; a valve adapted alternately to connect said fluid conduits with said pressure line; means to actuate said valve to effect communication between said pressure line and the one of said conduits having the greater capacity thereby to effect rapid forward traverse of said head; means controlled by the traverse of said head to shift said valve to cause it to effect communication between said pressure line and the one of said conduits having the lesser capacity to effect slow feed of said head; and means controlled by the slow forward feed of said head to connect said pressure line with said third fluid conduit thereby to effect rapid retraction of said head.

7. A machine tool combining a translatable head; a cylinder; a piston movable in said cylinder; an operative connection between said piston and said head; a fluid pressure line; two fluid conduits of unequal capacity connected with said cylinder at one end thereof; a valve adapted successively to connect said fluid conduits with said pressure line to effect rapid traverse and slow feed of said head; means normally urging said valve toward one of its operative positions; means to actuate said valve in opposition to said means to effect communication between said pressure line and the one of said conduits having the greater capacity thereby to effect rapid traverse of said head; an interference member adapted to hold said valve in said rapid traverse position; and means actuated by the movement of said head to render said interference means ineffective, thereby to permit said valve to be moved to the position in which it effects slow feed of said head.

8. A machine tool combining a translatable head; a cylinder; a piston movable in said cylinder; an operative connection between said piston and said head; a fluid pressure line; two fluid conduits of unequal capacity connected with said cylinder at one end thereof; a valve of the sliding piston type adapted successively to connect said fluid conduits with said pressure line to effect rapid traverse and slow feed of said head; means normally urging said valve toward one of its operative positions; a shoulder movable with said piston; spring pressed interference members normally maintained in the path of said shoulder and normally serving to hold said valve against movement; and a plurality of dogs carried by said head and adapted successively to move said interference members out of the path of said shoulder thereby to permit said valve to be moved.

9. A machine tool combining a plurality of translatable members; fluid pressure means for translating said members, said means including a pump, a cylinder associated with each of said members, a piston movable in each of said cylinders and operatively connected with one of said members; a fluid conduit connecting said pump with each of said cylinders to effect translation of said members; a by-pass for said pump; a valve associated with each of said members and normally closing said by-pass, said valves being connected in series in said by-pass; and means actuated by the individual retraction of said members to open its respective by-pass valve thereby to permit a free and unobstructed circulation of fluid through said by-pass only when both of said members are retracted.

10. A machine tool combining a plurality of translatable members; fluid pressure means for translating said members, said means including a pump; a cylinder associated with each of said members; a piston movable in each of said cylinders; and operatively connected with one of said members; a fluid conduit connecting said pump with each of said cylinders to effect translation of said members; a by-pass for said pump; a by-pass valve associated with each of said members; means tending to open said valves to effect a free and unobstructed flow of fluid through said by-pass; interference members to prevent opening of each of said valves during translation of said members; and means actuated upon retraction of said translatable members to render said interference members ineffective thereby to permit said by-pass valves to open and afford a free and unobstructed circulation of fluid from said pump through said by-pass.

11. A machine tool combining a translatable member; a cylinder; a piston movable in said cylinder; an operative connection between said piston and said member; a fluid pump; major and minor conduits of unequal capacity connected to one end of said cylinder and adapted to receive fluid expelled by said pump and to conduct it into said cylinder at unequal rates to effect translation of said piston and said member; a valve to control the flow of fluid through said conduits; means actuated at a predetermined point in the translation of said member to shift said valve to discontinue the flow through the major conduit and to permit flow only through the minor conduit; and a relief line to pass a substantial portion of the out-put of the pump when the flow is discontinued through the major conduit.

12. A machine tool combining a translatable member; fluid actuated means to translate said member in one direction at relatively slow and rapid rates and in the opposite direction at a rapid rate; a valve to control the rate and direction of translation of said member; fluid pressure means normally tending during forward translation of the member to shift said valve successively to change its rate and direction of translation; interference means successively to prevent said valve from moving under the influence of said fluid pressure means; means actuated by the forward translation of said member to render the interference means ineffective thereby successively to change the rate and direction of translation of said member; and means actuated by reverse movement of said member to reverse the action of said fluid pressure means again to shift said valve to a position wherein it effects forward traverse of said member.

13. A machine tool combining a work-support; a plurality of identical tool heads arranged about said work-support; a tool rotatably carried by each of said tool-heads; means embodied in each of said heads to rotate its tool; a hydraulic motor and mechanical connections embodied in each of said tool-heads and adapted, upon actuation, to translate said tools relative to a work-piece fixed upon said work-support, to effect a plurality of tooling operations upon said work-piece; a hydraulic system, embodied wholly in the machine tool, for delivering fluid under pressure to said motors, said hydraulic system comprising a main pressure conduit; a branch line extending from said conduit to each of said hydraulic motors; a reservoir; an exhaust conduit leading to said reservoir; a branch line connecting each of said hydraulic motors with said exhaust conduit; a single constant delivery fluid pump connected with said reservoir and with said pressure conduit; means continuously to actuate said pump at a substantially constant rate to cause it to pass fluid in amount sufficient simultaneously to actuate all of said motors to give to all of said tools translation at a predetermined rate; an individual valve mechanism, including a shiftable valve, associated with each head for directing the flow of fluid from said pressure line into opposite ends of its associated motor; automatically actuated means for shifting said valves thereby alternately to effect forward and reverse translation of its associated tool; and means embodied in said hydraulic system automatically to limit the maximum pressure therein.

14. A self-contained hydraulically operated machine tool combining a single pump for passing oil at a volumetrically uniform rate; a plurality of tool-carriers; a single work-carrier; a plurality of hydraulic motors each mechanically connected to one of said tool carriers respectively; a reservoir; a plural branch conduit system interconnecting said reservoir, single pump and all of said motors; a prime-mover in said machine for uniformly driving said pump at a rate delivering sufficient oil to satisfy the maximum simultaneous requirements of said plurality of motors; a pressure-maintaining means for automatically diverting to said reservoir oil in excess of that used by said plurality of motors; a normally ineffective by-pass for said pump; and automatic means for rendering said by-pass effective upon retraction of said heads.

15. A machine tool combining a plurality of translatable members; fluid pressure means for translating said members, said means including a reservoir; a constant delivery pump, having its intake port connected with said reservoir; a hydraulic motor operatively connected with each of said members; a fluid conduit connecting said pump with each of said motors to effect translation of said members; a pressure-free by-pass for said pump; a plurality of valves embodied in said by-pass and adapted to maintain said by-pass ineffective during movement of said members in one direction; and means actuated by each of said members at the extreme end of its movement in the other direction to open one of said valves thereby to render effective said by-pass to permit unrestricted exhaust of said pump into said reservoir only when both of said translatable members have had their complete movements in said other direction.

16. A machine tool combining a plurality of translatable members; fluid pressure means for advancing and retracting said members, said means including a reservoir; a constant delivery pump having its intake port connected with said reservoir; a hydraulic motor operatively connected with each of said members; a fluid conduit connecting said pump with each end of each of said motors; valves adapted alternately to connect said conduits with said pump to effect translation of said members; a pressure-free by-pass connecting said pump with said reservoir; duel means to maintain said by-pass ineffective during movement of each of said members in one direction; and means actuated by each of said members as it reaches its retracted position to render ineffective one of said dual means thereby to permit unrestricted exhaust of said pump into said reservoir.

17. A machine tool combining a plurality of translatable members; fluid pressure means for translating said members, said means comprising a reservoir; a constant delivery pump receiving fluid from said reservoir; a hydraulic motor operatively connected with each of said members; a fluid conduit connecting said pump with each of said motors; valve means to control the flow of fluid to said motors to effect forward and retractive movements of said members; a by-pass conduit connecting the outlet of said pump with said reservoir; two valves embodied in said by-pass and both normally closing same; means actuated by the complete retractive movement of one of said members to open one of said valves; and means actuated by the complete retractive movement of the other member to open the other of said valves thereby to effect complete opening of said by-pass.

In witness whereof, I have hereunto subscribed my name.

ROBERT M. GALLOWAY.